(12) United States Patent
Kini et al.

(10) Patent No.: US 10,320,161 B2
(45) Date of Patent: Jun. 11, 2019

(54) MECHANICAL RACK POSITION INDICATOR

(71) Applicant: ABB Schweiz AG, Baden (CH)

(72) Inventors: Amar Kini, Lake Mary, FL (US); Alessandro Bonfanti, Lake Mary, FL (US)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 15/872,509

(22) Filed: Jan. 16, 2018

(65) Prior Publication Data

US 2018/0145487 A1 May 24, 2018

Related U.S. Application Data

(63) Continuation of application No. PCT/US2016/042063, filed on Jul. 13, 2016.

(Continued)

(51) Int. Cl.
*H02B 11/02* (2006.01)
*H02B 11/12* (2006.01)
(Continued)

(52) U.S. Cl.
CPC ............ *H02B 11/02* (2013.01); *H01H 9/16* (2013.01); *H02B 11/12* (2013.01); *H02B 11/127* (2013.01); *H02B 15/02* (2013.01)

(58) Field of Classification Search
CPC ........ H01H 9/16; H02B 11/127; H02B 11/12; H02B 11/02; H02B 15/02

(Continued)

(56) References Cited

U.S. PATENT DOCUMENTS

| 1,565,287 A | * | 12/1925 | Mirrey | ................... | H02B 11/00 |
| | | | | | 200/308 |
| 3,683,145 A | * | 8/1972 | Berenbaum | .............. | H01H 9/16 |
| | | | | | 200/308 |

(Continued)

FOREIGN PATENT DOCUMENTS

| EP | 0685914 A2 | 5/1995 |
| EP | 2110905 A2 | 4/2009 |
| EP | 2338158 B1 | 9/2009 |

OTHER PUBLICATIONS

International Searching Authority, International Search Report & Written Opinion issued in corresponding Application No. PCT/US2016/042063, dated Sep. 27, 2016, 8 pages.

*Primary Examiner* — Anatoly Vortman
(74) *Attorney, Agent, or Firm* — Taft Stettinius & Hollister LLP; J. Bruce Schelkopf

(57) ABSTRACT

A positional indicator system that includes a mounting bracket having a slot that extends along a linear slot axis. A drum may be rotably coupled to the mounting bracket so as to rotate about an axis that is offset from, and non-intersecting with, the slot axis. A pin body of a pin assembly may extend into a chamber of an electrical housing so as to be coupled to a displaceable electrical component, and thereby be linearly displaced along the slot as the displaceable electrical component is linearly displaced within the chamber. The pin assembly may be coupled to a biasing element that is coupled to the drum. A plurality of indicia may be positioned or mounted on the biasing element, such as via a windable indicator plate, and may provide a visual indication through a window of the electrical housing of the relative position of the displaceable electrical component.

20 Claims, 9 Drawing Sheets

Related U.S. Application Data

(60) Provisional application No. 62/191,813, filed on Jul. 13, 2015.

(51) Int. Cl.
*H01H 9/16* (2006.01)
*H02B 11/127* (2006.01)
*H02B 15/02* (2006.01)

(58) Field of Classification Search
USPC .......................................................... 361/608
See application file for complete search history.

(56) References Cited

U.S. PATENT DOCUMENTS

| | | | |
|---|---|---|---|
| 4,011,424 A * | 3/1977 | Ericson | H01H 9/16 200/308 |
| 4,101,744 A | 7/1978 | Wilson | |
| 5,278,722 A | 1/1994 | Peruso | |
| 6,005,208 A * | 12/1999 | Castonguay | H02B 11/10 200/308 |
| 6,080,947 A | 6/2000 | Ulerich et al. | |
| 6,130,390 A | 10/2000 | Castonguay | |
| 6,160,229 A * | 12/2000 | Grelier | H02B 11/10 200/50.26 |
| 7,847,203 B2 * | 12/2010 | Narayanan | H02B 11/10 200/400 |
| 8,222,552 B2 * | 7/2012 | Kim | H02B 11/10 200/308 |
| 8,247,716 B2 * | 8/2012 | Weister | H02B 11/10 200/50.24 |
| 8,299,378 B2 * | 10/2012 | Kim | H02B 11/10 200/50.26 |
| 8,299,380 B2 * | 10/2012 | Kim | H02B 11/10 200/308 |
| 2007/0200652 A1 | 8/2007 | Gibson et al. | |
| 2009/0015357 A1 | 1/2009 | Ahn | |
| 2010/0163374 A1 | 7/2010 | Kim et al. | |

\* cited by examiner

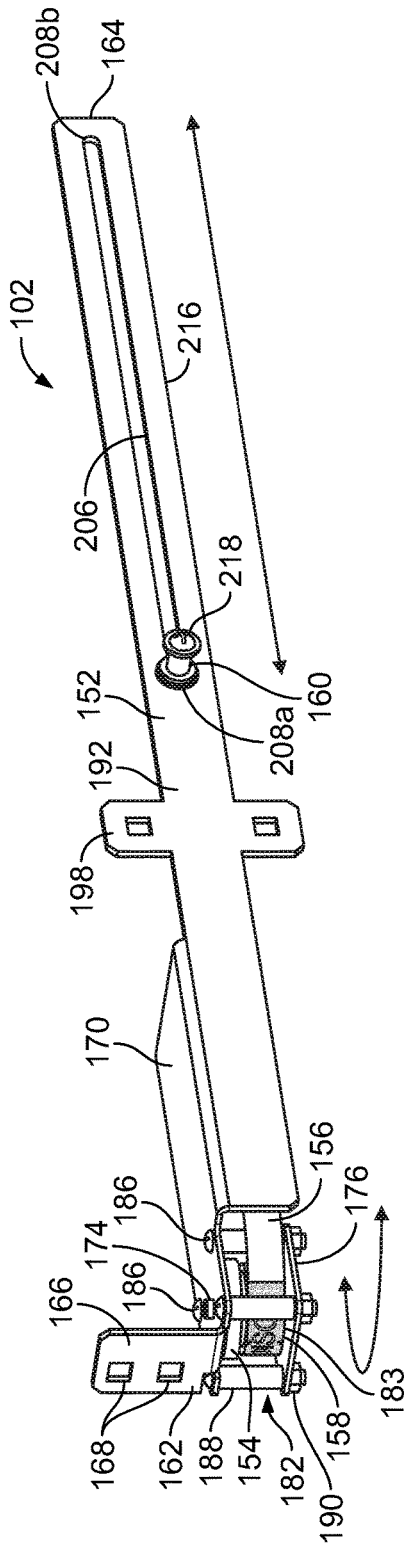
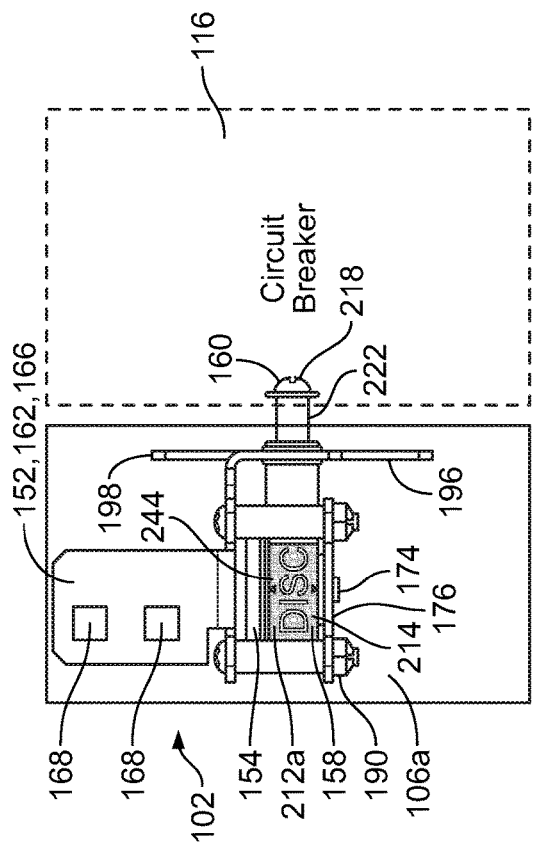
FIG. 6A
FIG. 6B

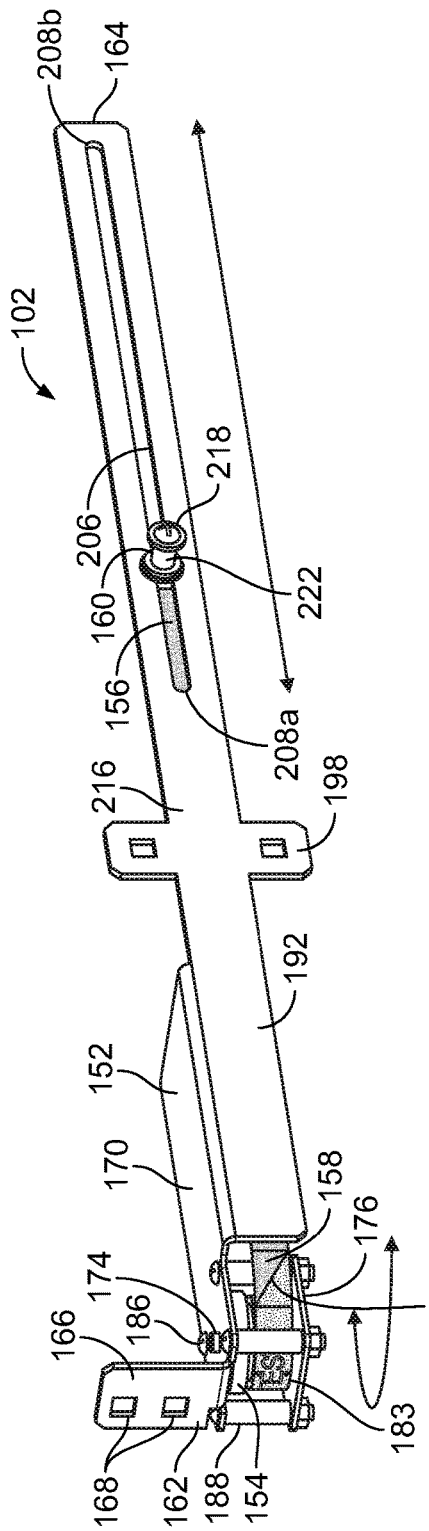
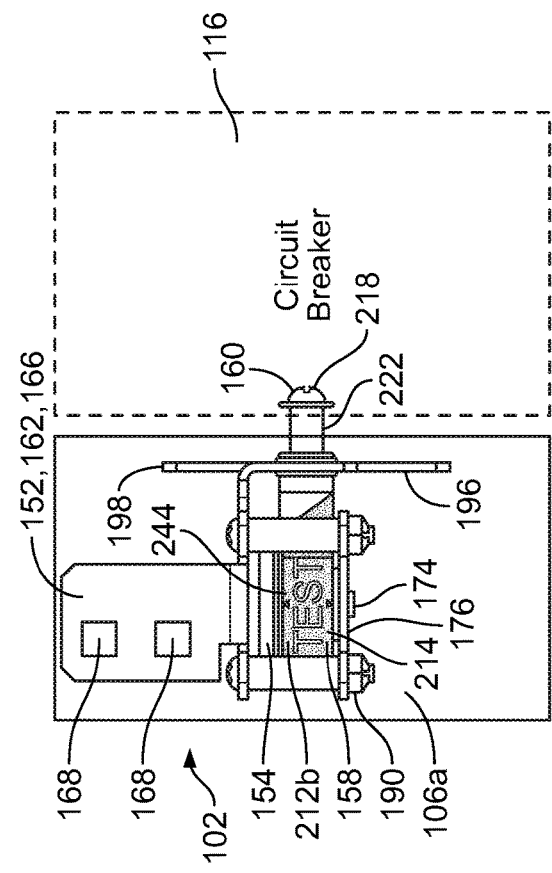
FIG. 7A
FIG. 7B

MECHANICAL RACK POSITION INDICATOR

BACKGROUND

Embodiments of the present invention generally relate to a position indicator for moveable electrical components. More particularly, but not exclusively, embodiments of the present invention relate to a mechanical position indicator system that provides, in real-time, an external visual indication of a rack position of displaceable components of electrical devices.

Electrical power distribution and control devices often include electrical components that may be selectively displaced relative to a housing and/or other components of the power distribution and control device. For example, circuit switching devices, such as circuit breakers and circuit interrupters, among other circuit switching devices, potential transformers, and/or control power transformers may be selectively mounted within a switchgear housing, including in the housing of at least certain low and medium voltage switchgears. During certain operations, including during installation, maintenance, and/or replacement, such displaceable electrical components may be displaced within a chamber of a housing such that the displaced electrical component is operably engaged, partially engaged, or operably disengaged with/from the electrical power distribution and control device. For, example, a current switching device may be displaced relative to an associated contact pins so as to at least assist in energizing or de-energizing the associated circuit(s).

Given the level of current that may flow through at least some displaceable electrical components, as well as the size and/or weight of the displaceable electrical components, such displacement of displaceable electrical components is typically accomplished in a manner that avoids direct physical contact between the displaceable electrical components and a worker. Additionally, an accurate indication of the position of the displaceable electrical component relative to at least a mating electrical component of the switchgear may be utilized to prevent damage to the circuit switching device and switchgear, as well as prevent harm to the worker.

BRIEF SUMMARY

An aspect of the present disclosure is a positional indicator system for a displaceable electrical component that is positioned within a chamber of a housing. The positional indicator system may include a mounting bracket having a slot that extends between a first end and a second end of the slot along a slot axis. The positional indicator system may also include a drum that is rotably coupled to the mounting bracket, the drum being positioned to rotate about an axis of rotation that is offset from, and non-intersecting with, the slot axis. The positional indicator system further includes a pin body that extends into the chamber by a length that facilitates the pin body being operably coupled to the displaceable electrical component such that linear displacement of the displaceable electrical component within the chamber is translated into linear displacement of the pin body along at least a portion the slot. Additionally, the positional indicator system includes a biasing element having a first end and a second end, the first end being coupled to the drum, and the second end being coupled to the pin body. At least a portion of the biasing element is configured to be both unwound from the drum and linearly displaced as the pin body is linearly displaced along the slot toward the second end. Further, the positional indicator system includes a plurality of indicia that is positioned about at least a portion of the biasing element, at least a portion of the plurality of indicia that is wound about the drum providing a visual indication of a relative position of the displaceable electrical component.

Another aspect of the present disclosure is a positional indicator system for a displaceable electrical component that is positioned within a chamber of a housing, the positional indicator system having a bracket that includes a slot and a pin body, the pin body being sized for linear displacement along the slot and structured to be coupled to the displaceable electrical component when the displaceable electrical component is linearly displaced within the chamber. The positional indicator system also includes a biasing element that is coupled to both the pin body and a rotatable drum. At least a portion of an arm portion of the biasing element being structured to be wound along the rotatable drum when the pin body is displaced along the slot in a first direction, and to be unwound from the rotatable drum and linearly displaced as the pin body is displaced along the slot in a second direction. The positional indicator system also may include a window that is configured to provide visual access to a portion of a plurality of indicia that is positioned on a segment of the arm portion that is wound about the rotatable drum, the portion of the plurality of indicia visually accessible through the window providing a real-time indication of the relative position of the displaceable electrical component.

A further aspect of the present disclosure is a system comprising a switchgear housing having a front wall and at least one chamber. The front wall of the switchgear housing includes an opening positioned to provide access to the chamber. The system also includes a displaceable electrical component that is mounted to a moveable device, the moveable device being configured to at least linearly displace the displaceable electrical component within the chamber. Additionally, the system includes a positional indicator system having a pin body coupled to the displaceable electrical component. The pin body is structured to be linearly displaced within a slot as the moveable device linearly displaces the displaceable electrical component. Further, the pin body is coupled to a second end of a biasing element, a first end of the biasing element being coupled to a rotatable drum. A segment of the biasing element may have a plurality of indicia. At least a portion of the segment of the biasing element may be wound about the rotatable drum as the moveable device linearly displaces the displaceable electrical component in a first direction, while at least a portion of the segment of the biasing element may be unwound from the rotatable drum and linearly displaced as the moveable device linearly displaces the displaceable electrical component in a second direction. The system further includes a window in the switchgear housing that is configured to provide visual access to a portion of a plurality of indicia that is positioned on at least a portion of the segment that is wound about the rotatable drum. The portion of the plurality of indicia that is visually accessible through the window may provide a real-time indication of the relative position of the displaceable electrical component.

BRIEF DESCRIPTION OF THE DRAWINGS

The description herein makes reference to the accompanying figures wherein like reference numerals refer to like parts throughout the several views.

FIG. 6A illustrates a perspective side view of a positional indicator system at .a first position.

FIG. 6B illustrates a schematic representation of a first position indicator of a windable indicator plate being externally viewable through a window when a positional indicator system is at the first position.

FIG. 7A illustrates a perspective side view of a positional indicator system at an intermediate position.

FIG. 7B illustrates a schematic representation of an intermediate position indicator of the windable indicator plate being externally viewable through the window when a positional indicator system is at the intermediate position.

Figure 1A:
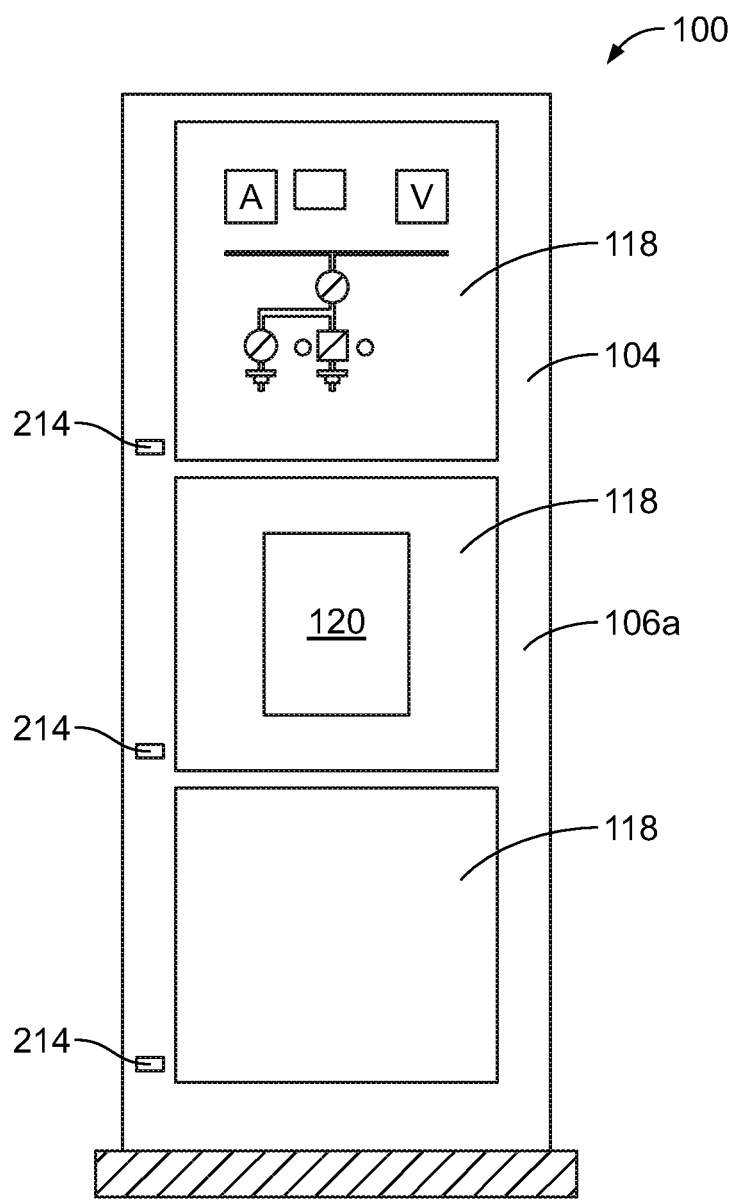
FIG. 1A illustrates a front view of an exemplary switchgear having windows for a mechanical positional indicator system.

The foregoing summary, as well as the following detailed description of certain embodiments of the present invention, will be better understood when read in conjunction with the appended drawings. For the purpose of illustrating the invention, there is shown in the drawings, certain embodiments. It should be understood, however, that the present invention is not limited to the arrangements and instrumentalities shown in the attached drawings.

DESCRIPTION OF THE ILLUSTRATED EMBODIMENTS

Certain terminology is used in the foregoing description for convenience and is not intended to be limiting. Words such as "upper," "lower," "top," "bottom," "first," and "second" designate directions in the drawings to which reference is made. This terminology includes the words specifically noted above, derivatives thereof, and words of similar import. Additionally, the words "a" and "one" are defined as including one or more of the referenced item unless specifically noted. The phrase "at least one of" followed by a list of two or more items, such as "A, B or C," means any individual one of A, B or C, as well as any combination thereof.

Figure 1B:
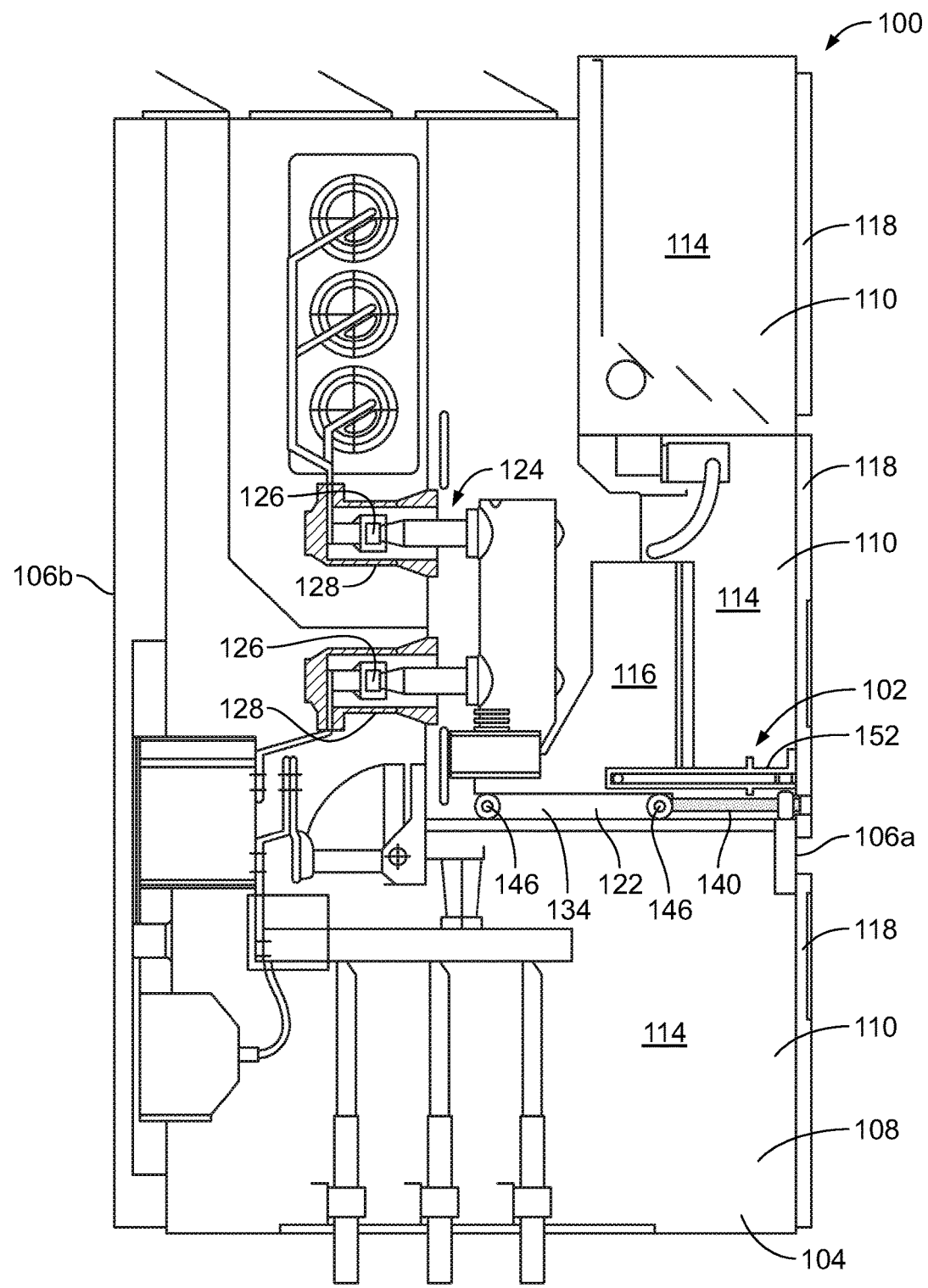
FIG. 1B illustrates a side view of the exemplary switchgear having a mechanical positional indicator system structured to indicate the relative position of a displaceable electrical component.

FIGS. 1A and 1B illustrate front and side views, respectively, of an exemplary switchgear 100 that includes a mechanical positional indicator system 102 that is structured to indicate the relative position of a displaceable electrical component. As shown, the switchgear 100 includes a housing 104 having opposing front and rear walls 106a, 106b that are separated by at least opposing sidewalls 108 of the housing 104. Referencing FIGS. 1A-2, the housing 104 may include one or more chambers 110 that are recessed into the housing 104. Additionally at least a portion of the front wall 106a of the housing 104 may include an opening 112 that provides access to the inner area 114 of an adjacent chamber 110. The housing 104 may further include one or more doors 118 that are pivotally coupled to the front wall 106a of the housing 104, and which may be configured to selectively cover at least a portion of the opening 112 of an adjacent chamber 110. For example, in the depicted, embodiment, the housing 104 includes three doors 118, with each door covering an opening 112 to a different chamber 110 in a manner that may at least assist in controlling access to the inner area 114 of the associated chamber 110. Further, the doors 118 may, or may not, include a window 120 that may provide visual access into the inner area 114 of the associated chamber(s) 110.

Figure 3:
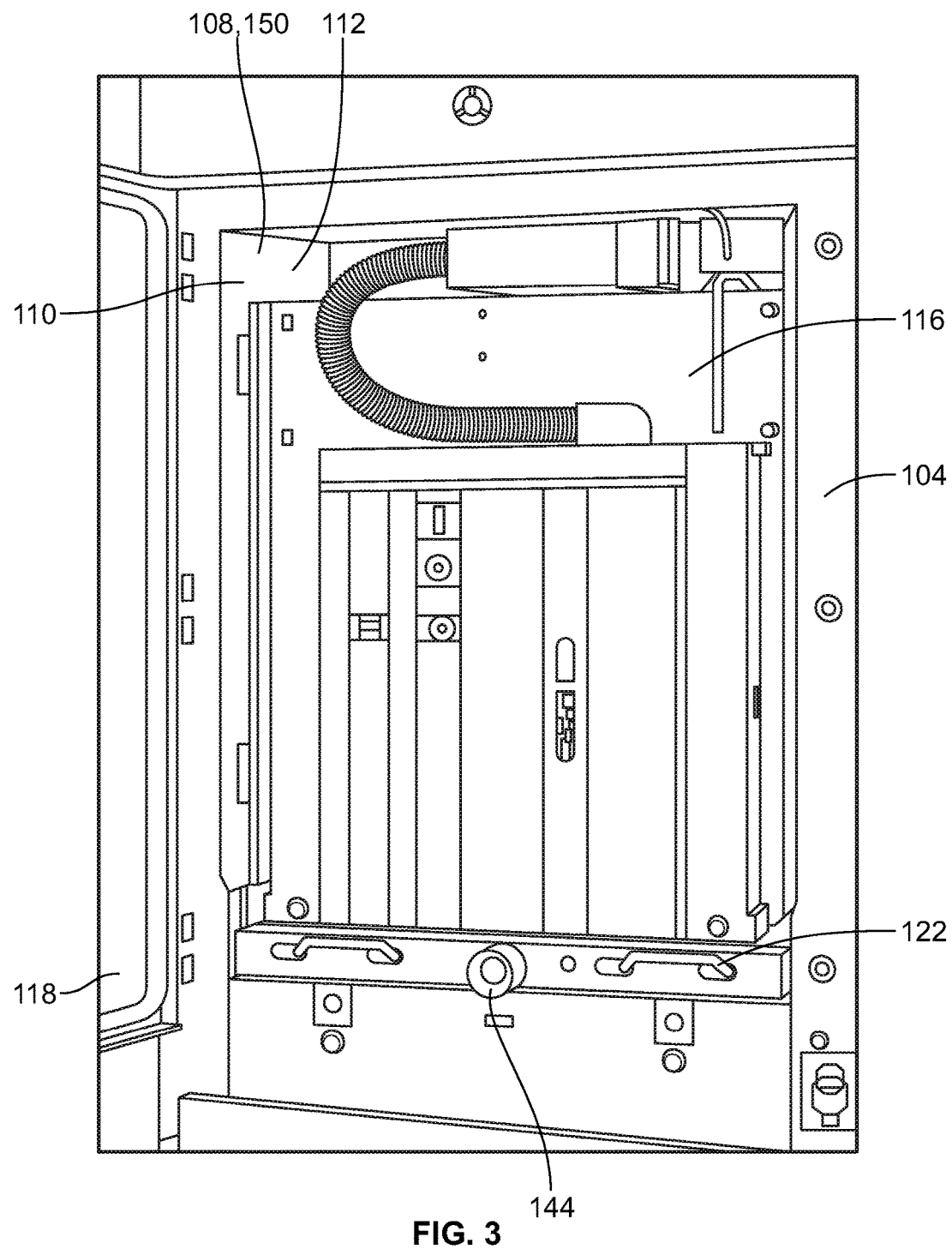
FIG. 3 illustrates a front side view of an exemplary displaceable electrical component positioned in the inner area of the chamber shown in FIG. 2.
Figure 4A:
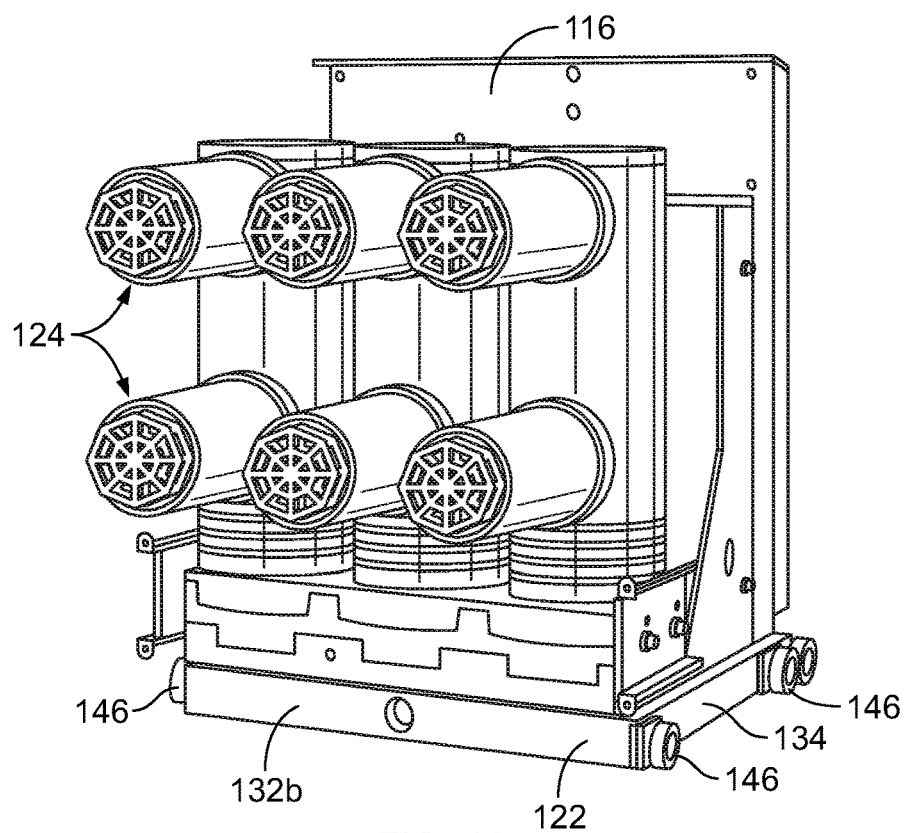
FIG. 4A illustrates a rear side perspective of the exemplary displaceable electrical component shown in FIG. 3 positioned on a moveable device.

According to certain embodiments, the inner area 114 of one or more of the chambers 110 may be sized to receive placement of a selectively displaceable electrical component 116, such as, for example, a circuit switching device, potential transformer, and/or control power transformer, among other selectively displaceable electrical components. For example, FIGS. 1A and 3 illustrate an example of a displaceable electrical component 116 in the form of a circuit breaker that is positioned within the inner area 114 of the exemplary chamber 110 shown in FIG. 2. As depicted in FIGS. 3 and 4A, the displaceable electrical component 116 may be mounted to a moveable device 122 (FIG. 4B), which may be part of a rack system that is used in displacing the displaceable electrical component 116 about the chamber 110. Moreover, according to such an example, the moveable device 122 may be utilized in establishing a mechanical connection between a panel of the switchgear 100 and the circuit breaker. For example, the moveable device 122 may be utilized to displace a contact system 124 of the circuit breaker into engagement with, as well as disengage the circuit breaker from, contact pins 126 of the switchgear 100 that may extend into isolating tulips 128.

Figure 4B:
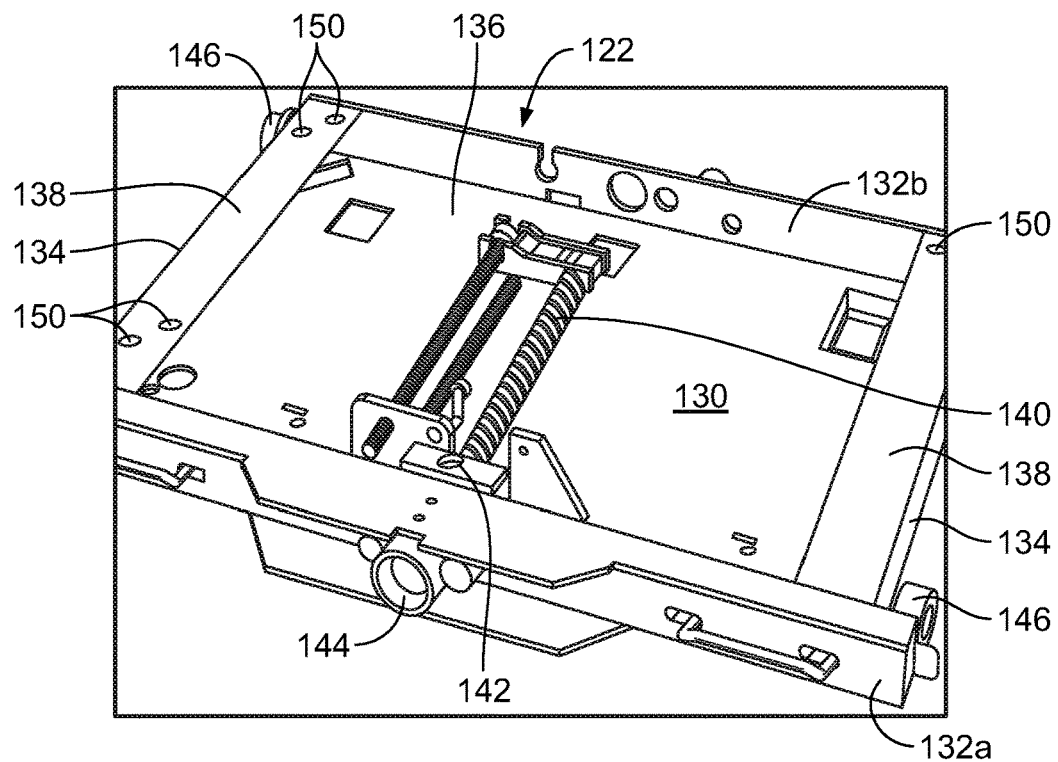
FIG. 4B illustrates an exemplary moveable device which may be coupled to a displaceable electrical component.

Referencing FIG. 4B, the depicted exemplary moveable device 122 may include an inner region 130 that is generally defined by a front plate 132a, side plates 134, rear plate 132b, base portion 136, and upper flanges 138 of the moveable device 122. The inner region 130 of the moveable device 122 may be configured to house at least a portion of the components that may be utilized in the displacement of the moveable device 122 within an associated chamber 110. For example, the inner region 130 of the moveable device 122 may house at least a portion of a spindle 140 and a mating nut 142. As discussed below, according to certain embodiments, when the front plate 132a of the moveable device 122 is operably secured to the housing 104, rotational displacement of the spindle 140 may, through engagement with the nut 142, be translated into linear displacement of other components of the moveable device 122 along the chamber 110. Such rotational displacement of the spindle 140 may occur in a variety of different manners, including, for example, through use of an electrical motor or a hand crank. For example, according to the illustrated embodiment, the spindle 140 may be coupled to a coupler 144 that may extend at least from or through a front plate 132a of the moveable device 122. Further, the coupler 144 may include a male or female driver or socket that is configured for mating engagement with an electric motor or hand crank such that operation of the electric motor or crank rotatably displaces the spindle 140.

Figure 2:
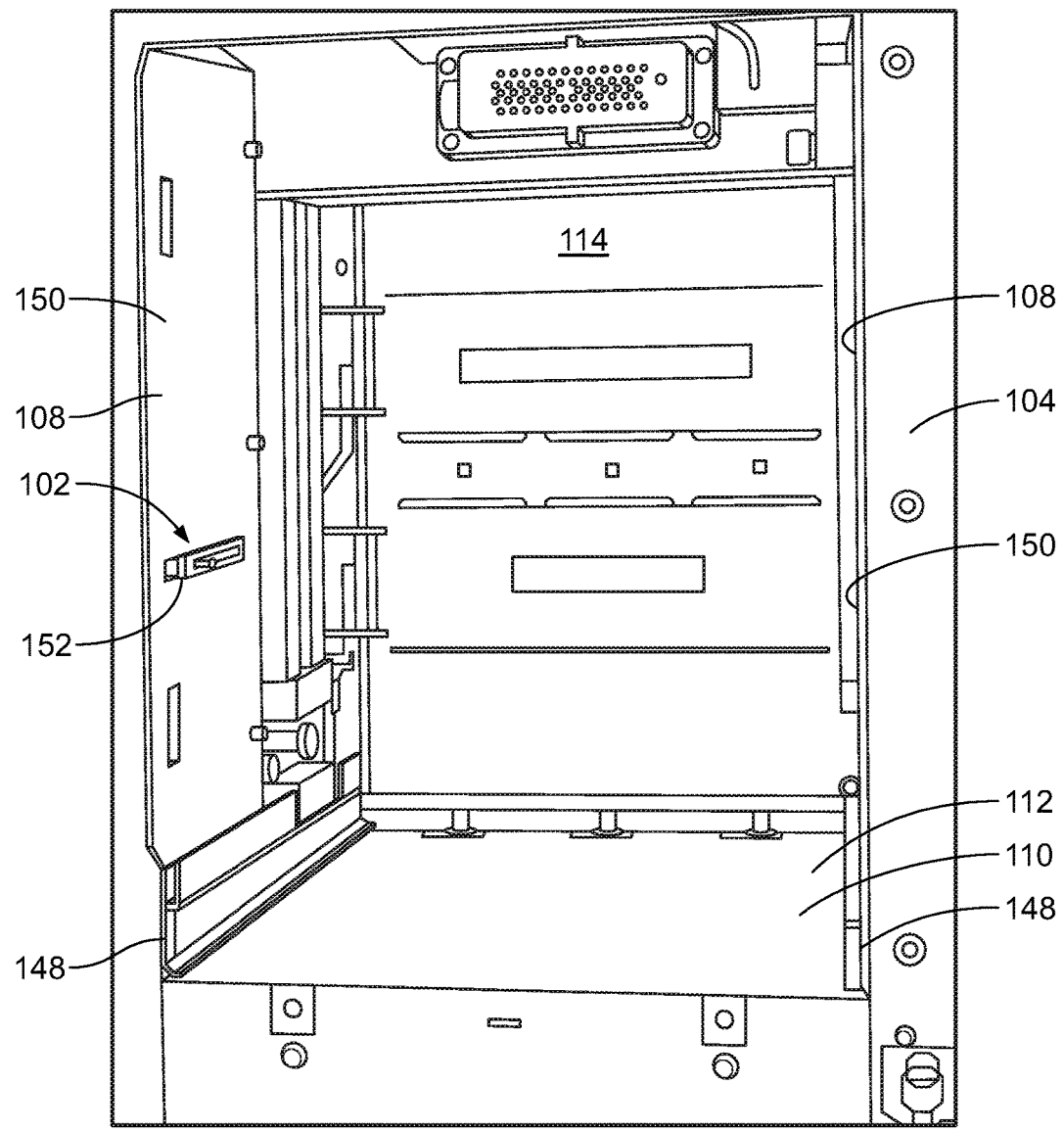
FIG. 2 illustrates a front side perspective view of an inner area of a chamber of an exemplary switchgear housing that includes a positional indicator system.

The moveable device 122 may also include a plurality of wheels 146 that are structured to be received in travel rails or tracks 148 that are positioned in the chamber 110 of the housing 104, as shown for example in FIG. 2. Moreover, according to the depicted embodiment, the moveable device 122 may include a pair of wheels 146 on both side plates 134 that are structured to be received in an adjacent travel rail or track 148 that is positioned along an inner portion 150 of the adjacent sidewall 108 of the switchgear housing 104. According to such an embodiment, the wheels 146 may facilitate the ease with which at least a portion of the moveable device is displaced within the chamber 110 during operable rotation of the spindle 140.

The upper flanges 138 of the moveable device 122 may be configured to facilitate coupling of the displaceable electrical component 116 to the moveable device 122 and/or to otherwise assist in supporting the placement of the displaceable electrical component 116 on the moveable device 122. For example, the upper flanges 138 may include one or more apertures 150 that may be adapted to receive the insertion of projections from the bottom portion of the displaceable electrical component 116 and/or the placement of mechanical fasteners, including bolts, screws, and/or pins. According to such as configuration, the displaceable electrical component 116 may be displaced within the chamber 110 with those portions of the moveable device 122 that are displaced by operable rotation of the spindle 140.

Figure 5:
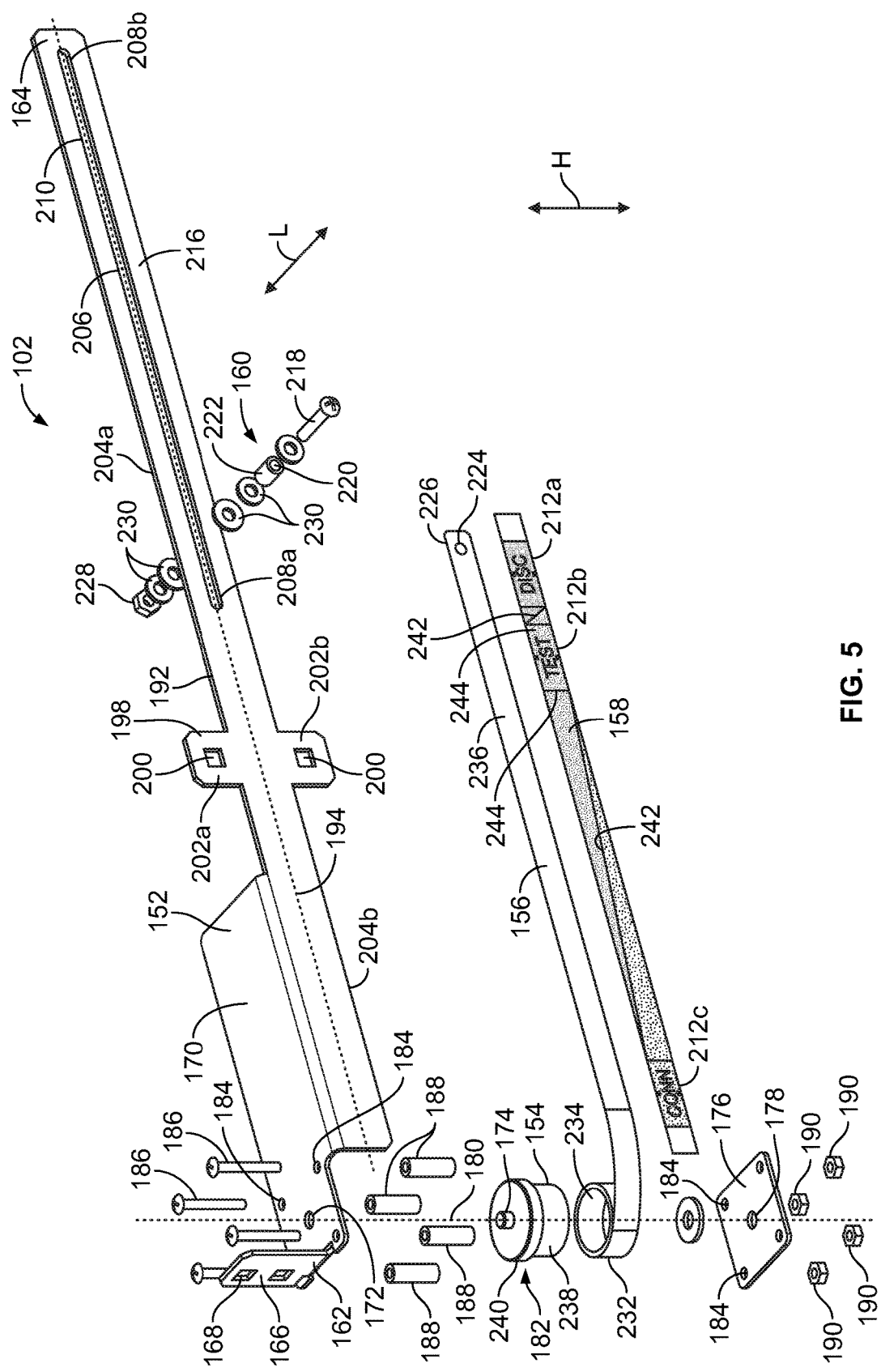
FIG. 5 illustrates an exploded perspective side view of a positional indicator system.

FIG. 5 illustrates an exploded perspective side view of an indicator system 102 according to an embodiment of the present invention. As illustrated, according to certain embodiments, the indicator system 102 may include a mounting bracket 152, a drum or spool 154, a biasing element 156, an windable indicator plate 158, and a pin assembly 160. The mounting bracket 152 is configured for mounting to the housing 104 of the switchgear 100 or to components or other surfaces or structures that are located therein. For example, according to certain embodiments, the mounting bracket 152 is adapted for mounting to an inner portion of one or more of the front wall 106a, sidewall 108, rear wall 106b, and/or other walls or partitions in or about the chamber 110. Further, the mounting bracket 152 may be configured for mounting to components or accessories positioned within the chamber 110.

According to the illustrated embodiment, the mounting bracket 152 includes a proximal end 162 and a distal end 164. The proximal end 162 may include a first mounting plate 166 that is configured to secure the mounting bracket 152 to an inner surface of the front wall 106a of the housing 104 of the switchgear 100 and/or to another surface or wall that is in general proximity to the inner surface of the front wall 106a. The first mounting plate 166 may include one or more apertures 168 that are sized to receive placement of at least a portion of one or more mechanical fasteners, such as, for example, bolts, screws, or pins, among other fasteners, that may securely couple or mount the first mounting plate 166 to the housing 104. Additionally, the first mounting plate 166 may generally extend upwardly from a top plate 170 of the mounting bracket 152 in a direction that is generally perpendicular to the top plate 170.

The top plate 170 may include a top aperture 172 that is configured to receive the placement of an upper portion of a spindle 174 for the drum or spool 154. Further, in addition to the top plate 170, the mounting bracket 152 may further include an opposing bottom plate 176. The bottom plate 176 may include a bottom aperture 178 that is sized to receive a bottom portion of the spindle 174. Thus, the top aperture 172 of the top plate 170 and the bottom aperture 178 of the bottom plate 176 may be generally aligned with each other along an axis of rotation 180 of the drum or spool 154. Further, the top and bottom plates 170, 176 may be separated or offset from each other to provide an interior space 182 between the top and bottom plates 170, 176 that as a height (as indicated by the "H" direction in FIG. 5) that is sized to accommodate the placement and rotational displacement of the drum or spool 154 therebetween. Such an interior space 182 may also provide a window 183 in the mounting bracket 152 through which at least a portion of at least the biasing element 156 and/or windable indicator plate 158 in the interior space 182 may be visually accessible. Further, according to certain embodiments, the top and bottom plates 170, 176 may be generally parallel to each other.

As shown in FIG. 5, according to certain embodiments, the bottom plate may be a detachable component of the mounting bracket 152. Such an embodiment may be configured to facilitate the placement of the drum or spool 154 between the top and bottom plates 170, 176. The detachable bottom plate 176 may be secured to the top plate 170 by one or more mechanical fasteners 186 that extend through opposing, and generally aligned holes 184 in the top and bottom plates 170, 176. For example according to the illustrated embodiments, the mechanical fasteners 186 may be bolts that secure the bottom plate 176 to the top plate via a mating engagement with a nut 190. Further, according to such an embodiment, one or more of the mechanical fasteners 186 may pass through at least a portion of a spacer 188 that is positioned in the interior space 182 between the top and bottom plates 170, 176. The spacers 188 may be sized to provide the interior space 182 between the top and bottom plates 170, 176 with a height (as indicated by the "H" direction in FIG. 5) that accommodates the placement and rotational displacement of the drum or spool 154 between the top and bottom plates 170, 176. Further, the spacers 188 and/or fasteners 188 may be arranged about the top and bottom plates 170, 176 so as to not interfere with the presence of a window 183 in the mounting bracket 152 through which at least a portion of at least the biasing element 156 and/or windable indicator plate 158 in the interior space 182 may be visually accessible. Additionally, according to certain embodiments, rather than being a separate, detachable component, the bottom plate 176 may be a portion of an integral, monolithic mounting bracket 152.

The mounting bracket 152 further includes an arm 192 that extends from at least the top plate 170 to the distal end 164 of the mounting bracket 152 along a central longitudinal axis 194 of the arm 192. Additionally, the central longitudinal axis 194 of the arm 192 may be generally perpendicular to, and non-intersecting with, the axis of rotation 180 of the drum or spool 154. According to certain embodiments, an outer surface 196 (FIG. 6B) of the arm 192 of the mounting bracket 152 may extend along at least an inner edge of the interior space 182 between the top and bottom plates 170, 176 such that, when the drum or spool 154 is operably positioned in the mounting bracket 152, the drum or spool 154 is outwardly offset from the arm 192.

The arm 192 may include a second mounting plate 198 that includes one or more apertures 200 that are sized to receive placement of at least a portion of one or more mechanical fasteners, such as, for example, bolts, screws, or pins, among other fasteners, that may secure the second mounting plate 198 to a wall or partition of the housing 104 and/or to a component in the chamber 110. Additionally, according to certain embodiments, the second mounting plate 198 may be configured to secured or mounted to a portion of wall or partition of the housing 104 and/or a portion of a component in the chamber 110 that extends in direction that is generally perpendicular to the direction of the wall or surface against which the first mounting plate 166 is secured. Additionally, according to certain embodiments, the mounting bracket 152 may be configured for at least a portion of the outer surface 196 of the arm 192 around the second mounting plate 198 to abut against the surface upon which the second mounting plate 198 is secured or mounted. Further, as shown by at least FIG. 5, the second mounting plate 198 may include a first tab 202a that generally extends upwardly from a first edge 204a of the arm 192 and/or a second tab 202b that generally extends downwardly from a second edge 204b of the arm 192, the first and second edges 204a, 204b being on opposing sides of the arm 192.

At least a portion of the arm 192 includes a slot 206 that is sized to receive slideable placement of at least a portion of the pin assembly 160. According to the illustrated embodiment, the slot 206 extends from a first end 208a of the slot 206 to a second end 208b of the slot 206 along a slot axis 210. According to certain embodiments, the slot axis 210 is generally aligned along at least a portion of the central longitudinal axis 194 of the arm 192. However, according to other embodiments, the slot axis 210 may be parallel or non-parallel to, and vertically offset from, the central longitudinal axis 194 of the arm 192. The length of the slot 206 between the first and second ends 208a, 208b of the slot 206 may vary. Further, as discussed below, according to certain embodiments, the first end 208a of the slot 206 may be positioned at a location that corresponds to a first position indicator 212a of the windable indicator plate 158 being viewable (FIG. 6B) through a corresponding window 138 in the mounting bracket 152 and/or a window 214 in front wall 106a of the housing 104 (FIG. 1A), while the second end 208b of the slot 206 may be positioned at a location that corresponds to a second position indicator 212c of the windable indicator plate 158 being viewable (FIG. 8B) through the window 138 in the mounting bracket 152 and/or window 214 in the front wall 106a. Alternatively, rather than being viewable through a window 214 in the front wall 106a of the housing 104, according to other embodiments, the mounting bracket 152 may be positioned at a location in the chamber 110, and the window 120 of the door 118 may be sized, such that position indicators 212a-c of the windable indicator plate 158 may be viewed through the window 120 of the adjacent door 118 as well as a window 138, if any, in the mounting bracket 152. Further, components of the indicator system 102 may be positioned or calibrated such that the position indicators 212a-c correspond to specific locations of the displaceable electrical component 116 relative to other portions of the switchgear 100, such as, for example, when the displaceable electrical component 116 is operably engaged or connected ("CONN") to the switchgear 100, disengaged or disconnected ("DISC") from the switchgear 100, or at a "TEST" position relative to the switchgear 100.

As illustrated, according to certain embodiments, the slot 206 may extend through the outer surface 196 and the opposing inner surface 216 of the arm 192. However, according to other embodiments, the slot 206 may extend through only a portion of the arm 192, such as extend from a mid-portion of the arm 192 and through the inner surface 216 but not through the outer surface 196. The slot 206 may have a variety of different lengths. For example, according to certain embodiments, the slot 206 may be sized such that the position of the first end 208 corresponds to the position indicator system 102 indicating that the displaceable electrical component 116 is in at a disengaged position while the second end 208 is located at a position that corresponds to the position indicator system 102 indicating that the displaceable electrical component 116 is in at an engaged position.

According to the illustrated embodiment, the pin assembly 160 includes a mechanical fastener 218 that passes through at least a cavity 220 in a pin body 222 and an aperture 224 at a second end 226 of the biasing element 156. The pin body 222 includes an outer surface that is configured for at least slideable displacement along the slot 206 of the arm 192 of the mounting bracket 152. Further, the pin body 222 may have a length (as indicated by the "L" direction in FIG. 5) such that the pin body 222 extends inwardly away from the inner surface 216 of the arm 192 and into a position at which the pin body 222 and/or the mechanical fastener 218 may engage a moveable component of the moveable device 122 and/or the displaceable electrical component 116 when positioned in the chamber 110. Alternatively, according to other embodiments, the pin assembly 160 may be attached to a moveable component of the moveable device 122 and/or the displaceable electrical component 116 such that, when the moveable component of the moveable device 122 and/or the displaceable electrical component 116 is operably positioned within the chamber 110, the pin assembly 160 may come into displaceable contact with the biasing element 156 and/or the windable indicator plate 158.

Referencing FIG. 5, according to the depicted embodiment, a first end of the mechanical fastener 218 may be positioned adjacent to an end of the pin body 222, while a second, opposing end of the mechanical fastener 218 may be lockingly engaged with a mating fastener 228, such as, for example, a nut, clip, or pin, among other mating fasteners, about an opposite side of the biasing element 156. Further, according to certain embodiments, the pin assembly 160 may include a plurality of washers or spacers 230 that may assist in securely coupling the pin assembly 160 to the mounting bracket 152 and/or the biasing element 156, as well as retain the pin body 222 at a selected position or orientation.

The biasing element 156 may be operably coupled to the drum or spool 154 in a number of different manners. For example, as shown by FIG. 5, according to certain embodiments, a first end 232 of the biasing element 156 may include a looped portion 234 and an arm portion 236. According to certain embodiments, the looped portion 234 may have a generally circular configuration that may be placed around a first outer portion 238 of the drum or spool 154. Alternatively, according to other embodiments, rather than including the looped portion 234, the biasing element 156 may be a continuous linear length of the arm portion 236 that extends from the first end 232 to the second end 226 of the biasing element 156. Further, the first end 232 of the biasing element 156 may be secured to the first outer portion 238 of the drum or spool 154 through the use of a mechanical fastener, such as, for example, a pin or set screw, press fit, adhesive, and/or weld, among other mechanisms or approaches for operable attachment.

The biasing element 156 may be constructed to permit at least a portion or segment of the arm portion 236 of the biasing element 156 to be rotably wound about the drum or spool 154 when the first position indicator 212a (FIG. 6B) is displayed in the window 138 in the mounting bracket 152 and/or the window 214 of the housing 104. Further, the biasing element 156 is also constructed to permit at least a portion or segment of the wound arm portion 236 to be rotably unwound about the drum or spool 154 and linearly displaced in a direction that is generally parallel to the direction of travel of the pin assembly 160 as the second end 224 of the biasing element 156 is displacement with the pin assembly 160 toward the second end 208*b* of the slot 206.

The biasing element 156 is structured to exert a biasing force against at least the pin assembly 160 that biases the pin assembly 160 generally in a direction toward the proximal end 162 of the mounting bracket 152. Thus, according to such an embodiment, the biasing element 156 may exert a biasing force against the pin assembly 160 when the pin assembly 160 is positioned in the slot 206 at a location away from the first end 208*a* of the slot 206, as well as continue to exert a biasing force against at least the pin assembly 160 when the pin assembly 160 is positioned at the first end 208*a* of the slot 206. According to certain embodiments, the biasing element 156 is a spring. For example, the biasing element 156 may be constructed from an elastic material or otherwise structured to provide a spring force that biases the biasing element 156 toward the drum or spool 154. According to other elements, the drum or spool 154 may be spring loaded such that drum or spool 154 provides a force that attempts to coil the biasing element 156 about the drum or spool 154.

The drum or spool 154 may further include a second outer portion 240 that has a size, such as a diameter, that is larger than a corresponding size of the adjacent first outer portion 238. Thus, according to the illustrated embodiment, the second outer portion 240 may provide a shoulder that may assist in maintaining the portions of the biasing element 156 that are wound about the first outer portion 238 of the drum or spool 154 at a location between the bottom plate 176 and the second outer portion 240 of the drum or spool 154.

The spindle 174 that extends from the drum or spool 154 and into the corresponding top aperture 172 in the top plate 170 and the bottom aperture 178 in the bottom plate 176 and may be separate from the drum or spool 154. For example, according to certain embodiments, the spindle 174 may extend through an interior portion of the drum or spool 154 and protrude away from opposing ends of drum or spool 154 such that the spindle 174 may be received in the top and bottom apertures 172, 178. Alternatively, according to other embodiments, the spindle(s) 174 may a portion of a monolithic body of the drum or spool 154.

The windable indicator plate 158 may be secured to the biasing element 156 such that at least a portion of the windable indicator plate 158 may be rotably wound and unwound with at least a portion or segment of the biasing member 156 about/from the drum or spool 154, as well as linearly displaced as the pin assembly 160 is displaced along the slot 206 of the arm 192. For example, according to certain embodiments, the windable indicator plate 158 may be secured to the biasing element 156 by a mechanical fastener, including one or more pins or rivets, an adhesive, or a weld, among other connections.

According to the illustrated embodiment, the windable indicator plate 158 includes a plurality of indicia that is indicative of a relative position of the displaceable electrical component 116. Alternatively, according to other embodiments, rather than being a separate component, the windable indicator plate 158 may be part of the arm portion 236 of the biasing element 156. Such indicia may be provided in a variety of different manners, such as, for example, letters, text, graphic representations, and through the use of colors, as well as combinations thereof. For example, as shown in FIGS. 5, 6B, 7B, and 8B, according to the illustrated embodiment, the plurality of indicia may include first, intermediate, and second position indicators 212*a-c* that provide text that indicates whether the displaceable electrical component 116 is in connected or "CONN" position, a "TEST" position, or a disconnected or "DISC" position, respectively. Additionally, the plurality of indicia in the illustrated embodiment also includes graphical representations in the form of sloping or tapered lines 242 between the first and intermediate position indicators 212*a-b*, and between the intermediate and the second position indicators 212*b-c* that may provide an indication of the direction in which the displaceable electrical component 116 and/or the moveable portions of the moveable device 122 are being displaced in the chamber 110 via operation of the spindle 140, as well as the relative proximity or location that the displaceable electrical component 116 is to at least one of the connected, test, or disconnected positions. Additionally, according to certain embodiments, the plurality of indicia may also include range indicators 244 in the form of lines on opposing sides of, and/or at a midsection of, the first, intermediate, and second position indicators 212*a-c* that provide a further indication of when the displaceable electrical component 116 has, or has not, reached a corresponding relative location.

The plurality of indicia may further include color coding, such as, for example, the first, intermediate, and second position indicators 212*a-c* being associated with the colors green, yellow, or red, respectively, among other colors. According to certain embodiments, when the displaceable electrical component 116 is at a position in which one of the first, intermediate, and second position indicators 212*a-c* is displayed through the window 183, 214, 120, only the color associated with that position indicator 212*a-c*, such as, for example, green for the first position indicator 212*a*, may be visible through the window 183, 214, 120. As the displaceable electrical component 116 is displaced within the chamber 110 by the displacement of the moveable portion of the moveable device 122, the degree to which that color is shown through the window 183, 214, 120 may be reduced, as that color may be displayed on one side of a sloping or tapered line 242. Accordingly, as that degree of that color is reduced, the degree to which a different color, which is positioned on the opposite side of the line 242 may increase. For example, in the current example, as the displaceable electrical component 116 is moved away from a relative positioned associated with the first position indicator 212*a* and toward a position associated with the second position indicator 212*b* the color yellow for the intermediate position indicator 212*b* may become increasingly visible on the opposing side of the sloping or tapered line 242. Thus, as the displaceable electrical component 116 continues to be displaced in the chamber 110, the degree that the color on one side of the sloping or tapered line 242, in this example green, is visible through the window 183, 214, 120 is decreased, while the color on the other side of the sloping or tapered line 242, in this example yellow, is increased. Further, according to such an embodiment, at least when the displaceable electrical component 116 reaches the next position, in this example the position in which the intermediate position indicator 212*b* ("TEST") is viewable through the window 183, 214, 120, only one color (yellow) may be viewable through the window 183, 214, 120.

As previously discussed, when the mounting bracket 152 is mounted to the housing 104 of the switchgear 100, at least a portion of the pin assembly 160, such as, for example, the pin body 222, may extend to a position within the chamber 110 in which the pin assembly 160 may be engaged by the displaceable electrical component 116 and/or moveable portions of the moveable device 122. For example, the pin assembly 160 may be positioned to engage an outer surface of the rear plate 132b of the moveable device 122, a projection that extends from the moveable device 122, or be received in an opening in the rear or side plate 132b, 134 of the moveable device 122, among other portions of the moveable device 122. Alternatively, the pin assembly 160 may be adapted to engage a surface, projection, or opening of the displaceable electrical component 116. Such engagement with the pin assembly 160 may at least initially occur upon operable placement of the displaceable electrical component 116 and/or the moveable device 122 in the chamber 110 and/or during initial displacement of the displaceable electrical component 116 and/or the moveable portions moveable device 122 in the chamber 110 toward a position in which the displaceable electrical component 116 is moved into operable electrical engagement with the switchgear 100. FIGS. 6A and 613 illustrate the state of the indicator system 102 when the displaceable electrical component 116 is initially racked into the switchgear 100 or otherwise electrically disconnected from the switchgear 100. As shown the pin assembly 160 may be coupled to the displaceable electrical component 116 and/or the moveable device 122 at a location that is translated to the pin assembly 160 being positioned about the first end 208a of the slot 206 of the arm 192 of the mounting bracket 152. With the pin assembly 160 at the first end 208a of the slot 206, at least a portion of the windable indicator plate 158 may be at least partially wound about the drum or spool 154 such the first position indicator 212a, which may be the position indicator 212a in closest proximity to the second end 226 of the biasing element 156, is at a location in which the first position indicator 212 ("DISC") is viewable through the window 183, 214, 120 of the mounting bracket 152, housing 104, and/or door 118. Further, according to certain embodiments, other indicia may also be viewable through the window 183, 214, 120 that provide an indication of the disconnected or disengaged position of the displaceable electrical component 116, including, for example, a single color such as green, and one or more range indicators 244.

As the displaceable electrical component 116 is displaced toward operable engagement with the switchgear 100, such as, for example, as the contact system 124 of the circuit breaker is displaced toward engagement with the contact pins 126 of the switchgear 100, the displaceable electrical component 116 and/or moving parts of the moveable device 122 may engage the pin assembly 160, if not already engaged, so that the linear displacement of the displaceable electrical component 116 and/or moveable device 122 is translated into linear displacement of the pin assembly 160 along the slot 206 in a direction generally toward the second end 208b of the slot 206. Further, as the pin assembly 160 has been displaced away from the first end 208a of the slot 206, the linear displacement of the pin assembly 160 may result in a portion or segment of the arm portion 236 of the biasing element 156 and associated portions of the windable indicator plate 158 being both unwound from the drum or spool 154 and linearly displaced in the generally same linear direction as the pin assembly 160. Accordingly, such unwinding of at least a portion of the biasing element 156 and windable indicator plate 158 may allow indicia on other portions or segments of the biasing element 156 and/or windable indicator plate 158 that remain wound about the drum or spool 154 to be visible through the window 183, 214, 120 in the mounting bracket 152, housing 104, and/or or the door 118, and thereby provide a real-time indication of the relative location of the displaceable electrical component. For example, in the depicted embodiment, when the displaceable electrical component 116 reaches an intermediate position, as indicated by FIGS. 7A and 7B, the displaceable electrical component 116 may be at a test position relative to the switchgear, as indicated by the text "TEST" of the intermediate position indicator 212b that is viewable through the window 183, 214, 120. Further, according to certain embodiments, other indicia that may be wound about the drum or spool 154 may also be viewable through the window 183, 214, 120 that provide an indication of the disconnected or disengaged position of the displaceable electrical component 116, including a single color such as yellow and one or more range indicators 244.

Portions or segments of the arm portion 236 of the biasing element 156 and associated portions of the windable indicator plate 158 may continue to be unwound from the drum or spool 154 and linearly displaced as the displaceable electrical component 116 continues to be displaced by the moveable device 122 into an engagement position for electrical connection with the switchgear 100. Again, as portions or segments of the arm portion 236 of the biasing element 156 and associated portions of the windable indicator plate 158 continue to be unwound from the drum or spool 154 by displacement of the displaceable electrical component 116, different indicia on the windable indicator plate 158 and/or biasing element 156 corresponding to the relative location of the displaceable electrical component 116 may become viewable through the window 183, 214, 120. Thus, the indicator system 102 may continue to provide, in real-time, an indication of the relative position of the displaceable electrical component 116.

The window 183, 214, 120 through positional indicators are provided by the positional indicator system 102 to a worker may be at a location that allows the worker to continuously receive from the indicator system 102, in real time, an indication of the relative position of the displaceable electrical component 116 externally from the housing 104. Moreover, such an indication, in real-time, may allow the worker to be aware of the relative position of the displaceable electrical component 116 without having to at least temporarily cease rotational displacement of the spindle 140 of the moveable device 122.

Figure 8A:
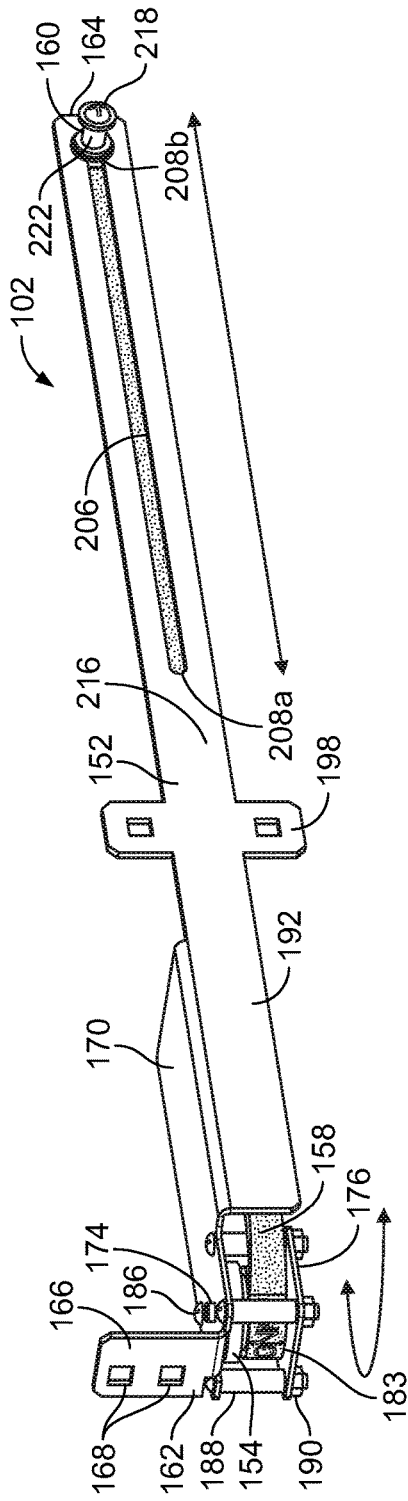
FIG. 8A illustrates a perspective side view of a positional indicator system at a second position.
Figure 8B:
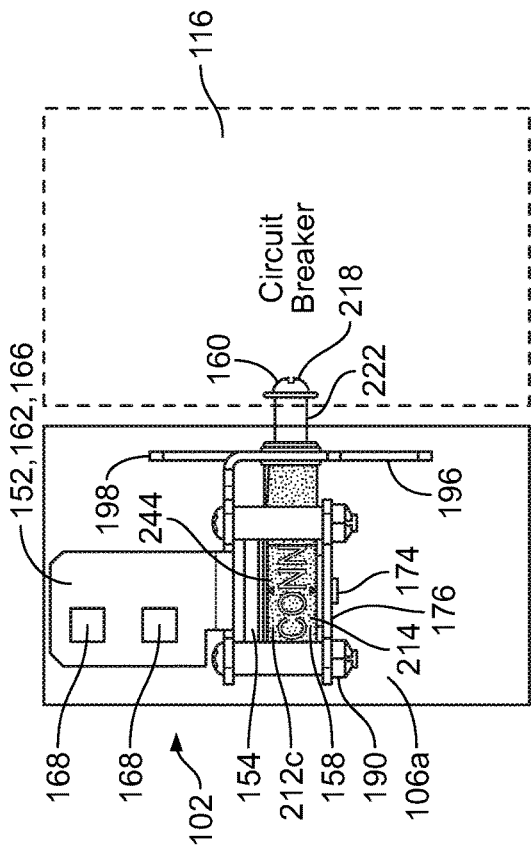
FIG. 8B illustrates a schematic representation of a second position indicator of the windable indicator plate being externally viewable through the window when a positional indicator system is at the second position.

FIGS. 8A and 8B provide an example of the state of the indicator system 102 when the displaceable electrical component 116 reaches a position in which the displaceable electrical component 116 is operably engaged or connected to the switchgear 100, such as, for example, when the contact system 124 of the circuit breaker is engaged with the contact pins 126 of the switchgear 100. As shown, when the displaceable electrical component 116 is operably engaged or connected to the switchgear 100 the pin assembly 160 may be generally at or around the second end 208b of the slot 206. Thus, as the pin assembly 160 was literally displaced toward the second end 208b, and further away from the drum or spool 154, additional portions of the arm portion 236 of the biasing element 156 as well as associated portions of the windable indicator plate 158 were unwound from the drum or spool 154 and linearly displaced in the general same direction as the linear displacement of the pin assembly 160 along the slot 206. Such unwinding and linear displacement of additional portions of the arm portion 236 and the windable indicator plate 158 may allow the second position indicator 212c that is wound about the drum or spool 154 to become visible through the window 183, 214, 120 in the mounting plate 152, the housing 104, and/ or the door 118. Further, as previously discussed, the second position indicator 212c may provide a visual indication that the displaceable electrical component 116 is operably engaged or connected to the switchgear 100, such as, for example, via the text "CONN". Further, according to certain embodiments, other indicia may also be viewable through the window 183, 214, 120 in addition to second position indicator 212c that also provide an indication of the connected or engaged position of the displaceable electrical component 116, including a single color such as red and one or more range indicators 244.

During certain situations, the displaceable electrical component 116 may be disengaged from the switchgear 100. According to such situations, the displacement of the displaceable electrical component 116, as well as the similar displacement of the movable portions of the moveable device 122 may allow the pin assembly to be displaced along the slot 206 in a direction generally toward the first end 208a of the slot 206. In such situations, the biasing force of the biasing element 156 and/or transmitted by the biasing element 156, may at least assist in pulling the pin assembly 160 toward the first end 208a of the slot 206, as well at least assist in winding at least a portion of the arm portion 236 of the biasing element 156 and associated portions of the windable indicator plate 158 about the drum or spool 154. Further, according to certain embodiments, such winding of at least a portion or segment of the arm portion 236 of the biasing element 156 and associated portions of the windable indicator plate 158 may be at least assisted by the drum or spool 154 being spring loaded. Additionally, the winding of the arm portion 236 of the biasing element 156 and windable indicator plate 158 may continue to provide a real-time, accurate indication of the relative location of the displaceable electrical component 116. For example, as portions or segments of the biasing element 156 and the windable indicator plate 158 are wound about the drum or spool 154, the indicia that is visible through the window 183, 214, 120 may also change so as to provide an accurate indication of the actual location of the displaceable electrical component, such as, for example an indication of the proximity of the displaceable electrical component 116 to the engaged ("CONN"), "TEST", and/or disengaged or disconnected ("DISC") positions.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

The invention claimed is:

1. A positional indicator system for a displaceable electrical component positioned within a chamber of a housing, the positional indicator system comprising:
    a mounting bracket having a slot that extends between a first end and a second end of the slot along a slot axis;
    a drum rotatably coupled to the mounting bracket, the drum positioned to rotate about an axis of rotation that is offset from, and non-intersecting with, the slot axis;
    a pin assembly including a pin body extending into the chamber by a length that facilitates the pin body being operably coupled to the displaceable electrical component such that linear displacement of the displaceable electrical component within the chamber is translated into linear displacement of the pin body along at least a portion the slot;
    a biasing element having a first end and a second end, the first end coupled to the drum, the second end coupled to the pin body, at least a portion of the biasing element being both unwound from the drum and linearly displaced as the pin body is linearly displaced along the slot toward the second end; and
    a plurality of indicia positioned about at least a portion of the biasing element, at least a portion of the plurality of indicia that is wound about the drum providing a visual indication of a relative position of the displaceable electrical component.

2. The positional indicator system of claim 1, further including a windable indicator plate mounted to an arm portion of the biasing element, and wherein the plurality of indicia is positioned about the windable indicator plate.

3. The positional indicator system of claim 2, wherein the biasing element biases the pin body toward the first end of the slot.

4. The positional indicator system of claim 3, further including a window in a front wall of the chamber of the housing, the window providing visual access to the portion of the plurality of indicia that is wound about the drum that provides a visual indication of the relative position of the displaceable electrical component.

5. The positional indicator system of claim 4, wherein the plurality of indicia includes at least three position indicators.

6. The positional indicator system of claim 4, wherein the mounting bracket includes at least a first mounting plate, the first mounting plate securing at least a portion of the mounting bracket at a position within the chamber.

7. The positional indicator system of claim 6, wherein the mounting bracket includes a second mounting plate, the second mounting plate mounted against a second wall, the first mounting bracket mounted against a first wall, the first wall being generally perpendicular to the second wall.

8. The positional indicator system of claim 1, wherein the pin body extends into the chamber at a location at which the pin body engages a moveable device that is coupled to the displaceable electrical component as the displaceable electrical component is linearly displaced within the chamber.

9. A positional indicator system for a displaceable electrical component that is positioned within a chamber of a housing, the positional indicator system comprising:
    a bracket having a slot;
    a rotatable drum coupled to the bracket;
    a pin assembly including a pin body sized for linear displacement along the slot and coupled to the displaceable electrical component when the displaceable electrical component is linearly displaced within the chamber;
    a biasing element coupled to both the pin body and the rotatable drum, the biasing element including an arm portion, at least a portion of the arm portion of the biasing element being wound along the rotatable drum when the pin body is displaced along the slot in a first direction and to be unwound from the rotatable drum and linearly displaced as the pin body is displaced along the slot in a second direction; and a window providing visual access to a portion of a plurality of indicia that is positioned on a segment of the arm portion that is wound about the rotatable drum, the portion of the plurality of indicia visually accessible through the window providing a real-time indication of the relative position of the displaceable electrical component.

10. The positional indicator system of claim 9, wherein the plurality of indicia are positioned on a windable indicator plate that is coupled to at least the arm portion of the biasing element.

11. The positional indicator system of claim 10, wherein the slot extends along a slot axis that is perpendicular to, and offset from, a rotational axis about which the drum rotates.

12. The positional indicator system of claim 11, wherein the biasing element transmits a biasing force against the pin body that biases the pin body in the first direction.

13. The positional indicator system of claim 12, wherein the bracket includes at least one mounting plate securing at least a portion of the bracket in the chamber.

14. The positional indicator system of claim 13, wherein the window is positioned in a front wall of the housing.

15. The positional indicator system of claim 14, wherein the pin body extends into the chamber at a location at which the pin body engages a moveable device that is coupled to the displaceable electrical component as the displaceable electrical component is linearly displaced within the chamber.

16. A system comprising:

a switchgear housing having a front wall and at least one chamber, the front wall including an opening positioned to provide access to the chamber;

a displaceable electrical component mounted to a moveable device, the moveable device configured to at least linearly displace the displaceable electrical component within the chamber;

a positional indicator system including a pin assembly having a pin body coupled to the displaceable electrical component, the positional indicator system further including a rotatable drum, a slot, and a biasing element, the pin body being linearly displaced within the slot as the moveable device linearly displaces the displaceable electrical component, the pin body coupled to a second end of the biasing element, a first end of the biasing element coupled to the rotatable drum, a segment of the biasing element having a plurality of indicia, at least a portion of the segment of the biasing element being wound about the rotatable drum as the moveable device linearly displaces the displaceable electrical component in a first direction, at least a portion of the segment of the biasing element being unwound from the rotatable drum and linearly displaced as the moveable device linearly displaces the displaceable electrical component in a second direction; and a window in the switchgear housing providing visual access to a portion of a plurality of indicia that is positioned on at least a portion of the segment that is wound about the rotatable drum, the portion of the plurality of indicia visually accessible through the window providing a real-time indication of the relative position of the displaceable electrical component.

17. The system of claim 16, wherein the window is positioned in the front wall of the switchgear housing.

18. The system of claim 16, wherein the window is positioned in a door that selectively covers the opening of the front wall of the switchgear housing.

19. The system of claim 16, wherein the plurality of indicia are positioned on a windable indicator plate that is coupled to a portion of the biasing element.

20. The system of claim 17, wherein the displaceable electrical component is at least one of the following, a circuit breaker, and potential transformer, and a control power transformer.

* * * * *